Patented Oct. 5, 1943

2,330,900

UNITED STATES PATENT OFFICE 2,330,900

MODIFIED HYDROCARBON POLYMER

Clarence M. Loane, Hammond, Ind., and James W. Gaynor, Chicago, Ill., assignors to Standard Oil Company, Chicago, Ill., a corporation of Indiana No Drawing. Application December 26, 1940, Serial No. 371,790

14 Claims. (Cl. 252—48)

The present invention relates to new and useful compounds, and methods for preparing the same, and more particularly to compounds which may be used as addition agents for lubricants. In particular, the new compounds comprise olefin polymers which contain chemically combined oxygen and sulfur. The polymers containing oxygen and sulfur may also contain chemically combined metallic elements.

When any of these compounds are used as addition agents in lubricants, such as lubricating oil, the properties of the oil are greatly improved by improving the oxidation stability, oiliness, and extreme pressure characteristics of the oil and by reducing sludge formation, viscosity increase, ring sticking, acidity formation and bearing corrosion resulting from the use of the oil. In addition to the usefulness of these compounds as additives and/or inhibitors for lubricants, they are also useful in the manufacture of soaps or they may be used as flushing oils with or without a diluent oil.

One object of our invention is to achieve the results mentioned in the preceding paragraph. Otherwise stated, it is an object of the present invention to provide lubricants for internal combustion engines which will be effective in providing adequate lubrication for such engines.

Another object of the invention is to provide addition agents for lubricants which will prevent or inhibit undesirable deterioration while the lubricant is being used.

Other objects and advantages of the invention will become apparent as the description thereof proceeds.

The invention is primarily directed to the oxidation and sulfurization products of certain iso mono-olefin polymers and copolymers of iso and normal olefins, particularly the low molecular weight polymers of iso mono-olefins such as isobutylene, isoamylene and the like and copolymers of the latter olefins with normal butylenes, and to derivatives thereof. These low molecular weight polymers, the molecular weights of which may range from about 100 to about 800, are obtained by polymerizing iso mono-olefins such as isobutylene or hydrocarbon mixtures containing the same in the liquid phase in the presence of a catalyst such as boron fluoride, aluminum chloride, zinc chloride or other similar active halide catalysts of the Friedel-Crafts type at a temperature of from about 0° F. to about 100° F., and preferably from about 20° F. to about 100° F. The polymers may also be obtained by the polymerization of these hydrocarbons in the presence of sulfuric acid, phosphoric acid and various siliceous catalysts such as fuller's earth, or clays which may be activated by treatment with mineral acid.

The entire polymer product may be subjected to oxidation and sulfurization as hereinafter described, or the polymer may be fractionated and the various fractions subsequently subjected to the oxidation and sulfurization treatments.

In order to describe the present invention clearly reference will be made to the low molecular weight polymers obtained by treating the butane-butylene fraction recovered from the gases produced in the cracking of petroleum oils for the manufacture of gasoline, and which contains from about 10% to about 25% isobutylene, together with butanes and normal butylenes.

The hydrocarbon mixture containing isobutylene is maintained under pressure sufficient to keep it in the liquid phase, and cooled to a temperature, for example, of about 32° F. and then from about 0.1% to about 2% boron fluoride, based on the isobutylene content of the mixture, is added with vigorous agitation. Excessive rise in temperature due to the heat of reaction is avoided by efficient cooling. After the polymerization of the isobutylene, together with a relatively minor amount of the normal olefins present, the reaction mass is neutralized and washed free of acidic substances arising from the catalyst, the oily polymer layer is separated and the polymer subsequently separated from unreacted light hydrocarbons by distillation. The polymer mixture so obtained, depending upon the temperature of reaction, varies in consistency from a light liquid to a viscous oily material and contains polymers having molecular weights ranging from about 100 to about 1500. For the purpose of the present invention polymers having molecular weights ranging from about 100 to about 800 are used. The low molecular weight polymers, obtained as above described, may be fractionated, preferably under reduced pressure, into fractions of increasing molecular weights,— e. g., a dimer fraction, a trimer fraction, etc. The low molecular weight polymers have the following approximate boiling point and gravity characteristics:

| Polymer | Boiling point, ° F. | Gravity, ° A. P. I. |
| --- | --- | --- |
| Dimer | 215 | 64 |
| Trimer | 350 | 50 |
| Tetramer | 475 | 45 |
| Pentamer | 570 (300° at 7 mm.) | 40 |
| Hexamer | 635 (320° at 2.5 mm.) | 37 |
| Heptamer | 700 (365° at 2 mm.) | 35 |

The corresponding fractions of isobutylenenormal-butylene co-polymers have approximately the same characteristics, the boiling points and gravities, however, being slightly higher.

Another source of an olefinic polymer suitable for oxidation and sulfurization is a fraction of the polymer obtained in the treatment of a gaseous hydrocarbon mixture containing isobutylene and normal butylene in the presence of a phosphoric acid catalyst, as a step in the synthesis of iso-octane. The polymer may be obtained by subjecting a gas mixture comprising $C_4$ olefins and paraffins to temperatures of about 270° F. to about 430° F., preferably about 300° F. to about 330° F., and at a pressure of from about 500 pounds per square inch to about 750 pounds per square inch, and preferably about 600 pounds per square inch, in the presence of a catalyst such as phosphoric acid on kieselguhr, diatomaceous earth or acid-treated clay. The mixed polymer obtained consists essentially of dimer, but contains in addition about 5 to 10% and usually 6 to 7% of heavy polymers comprising the trimer, the tetramer, and still higher polymers. This heavy fraction may be separated and sulfurized and oxidized as such or may be still further fractionated to give about 10 to 15% bottoms. Usually it is preferable to isolate and oxidize and sulfurize these final bottoms, which consist essentially of a tetramer fraction boiling between about 400° F. and 520° F.

It is also possible to prepare polymers suitable for oxidation and sulfurization by cracking wax and then polymerizing the resulting olefins in the presence of a suitable catalyst such as aluminum chloride.

The polymers or fractions thereof may be first oxidized and then sulfurized or they may be sulfurized first. In either event, the procedural steps for oxidation and sulfurization are the same. Alternatively, the two steps may be carried out simultaneously, as described hereinafter.

While the oxidation and sulfurization of the low molecular weight iso-olefin polymers such as, for example, the isobutylene polymers, may be accomplished by any suitable method or methods, those described hereinafter are the most desirable.

The oxidation of low molecular weight polymers such as those described above can be carried out in the liquid phase by bubbling air and/or oxygen or oxygen-containing gases through a body of the polymer at a temperature ranging from about 100° F. to about 400° F. and preferably from about 200° F. to about 350° F. This treatment may be carried on for a period of from 1 hour to about 200 hours. The oxidation can be conducted in the presence of oxidation catalysts either dissolved in or suspended in the polymer. As suitable catalysts we can use the oxides of metals which exist in more than one valence state, such as, for example, the oxides of vanadium, manganese, chromium, copper, iron, cobalt and the like. Since, in general such oxides are insoluble in the polymer they are suspended in the material to be oxidized. When the oxidation is carried out in the presence of the oxides of these metals, some of the metal forms metal soaps with the acid oxidation products of the low molecular weight polymer. Likewise, metal compounds are formed by oxidizing the low molecular weight isobutylene polymers in the presence of hydroxides of the above-mentioned metals or in the presence of the oxides or hydroxides of the alkali metals, the alkaline earth metals, magnesium sub-group metals, aluminum, tin, titanium and the like.

The oxidation of the trimer fraction obtained by the polymerization of the butane-butylene mixture, as described above, is illustrated by the following example: The trimer fraction having a boiling range of from about 325° F. to about 382° F. and having a gravity of about 50° A. P. I. was oxidized in the absence of any catalyst by heating it at about 200° F. while bubbling air through it. After an oxidation period of about 72 hours the oxidation product contained about 30% of neutral oxidation products boiling above the end point of the original charge stock, in addition to the other oxidized products to be described below. The oxidized low molecular weight polymer was steam distilled in the presence of excess caustic alkali and then separated into the fractions indicated below:

| Fraction | Per cent | Gravity, °A. P. I. |
|---|---|---|
| I. Steam distillate (oil layer): | | |
| A. Below original initial boiling point | 2.0 | 48.1 |
| B. Same boiling range as original charge | 62.0 | 48.4 |
| C. Above original end point | 15.0 | 32.6 |
| II. Neutral residual oil from steam distillation: | | |
| A. Oil layer | 15.0 | 19.1 |
| B. Product salted out from alkaline layer | 0.6 | |
| III. Acid (insoluble) recovered from alkaline layer | 0.2 | |
| IV. Water soluble acid, volatile aldehydes, loss | 5.2 | |

Neutral fractions I–C and II–A were combined and distilled under reduced pressure and the following fractions collected:

| Fraction | Boiling range, °F. | Pressure, mm. | Per cent of total material distilled |
|---|---|---|---|
| 1 | 123–141 | 4.5 | 5.6 |
| 2 | 141–161 | 4.5 | 15.1 |
| 3 | 161–178 | 4.0–4.5 | 18.2 |
| 4 | 178–203 | 3.5–4.0 | 18.9 |
| 5 | 203–238 | 3.0–3.5 | 13.0 |
| 6 | 238–298 | 3.0 | 10.3 |
| 7 | 298–352 | 3.0–3.5 | 10.1 |
| Residue | Above 352 | | 4.9 |
| "Trap" (mostly water) | | | 4.2 |

The boiling range of the original trimer cut at 4 mm. pressure is about 90°–130° F.

The above seven fractions were tested with 2,4-dinitrophenyl hydrazine solution for the presence of the carbonyl group. On being mixed with the reagent, fractions 1 to 4, inclusive, gave a yellowish precipitate, fraction 5 gave a reddish colored oil, and fractions 6 and 7 gave a reddish colored precipitate, indicating the presence of a carbonyl group in each of the fractions.

In another example some butylene-isobutylene polymer prepared as described above was oxidized in an autoclave with oxygen under pressure. The oil charged was chiefly tetramer, and had a boiling range of 356° F. to 613° F. It was placed in a glass liner in an autoclave which was arranged so that approximately one-half the volume was occupied by oil and one-half by gas space. The temperature was kept at 212° F. and oxygen at a pressure of about 135 pounds per square inch introduced. After about a twenty hour induction period in which no appreciable drop in pressure occurred, the oxygen consumption became rapid and the pressure dropped to about 15 pounds per square inch in about thirty hours. Oxygen was introduced as used up to maintain a pressure of about 100 pounds per square inch for about thirty hours more. The original charge and the oxidized product had the following properties:

|  | Charge | Product |
| --- | --- | --- |
| Bromine number | 61 | 48 |
| Gravity, ° A. P. I. | 41 | 36 |
| Solution temperature in one volume of acetone ° F. | +47 | −3 |
| Conversion to acid per cent | | 5 |
| Conversion to neutral oxidation products do | | 15 |
| Unoxidized do | 100 | 80 |

Larger yields of oxidation products can be obtained by continuing the oxidation for a longer period. Only a very small amount of peroxide oxygen was found in the product. It was found that the induction period could be cut from 20 hours to 2.5 hours by immersing a copper strip in the oil. The oxidation proceeds more rapidly at higher oxygen pressures but to control the rate of reaction adequate cooling must be provided. The process as described is a batch process but may readily be made continuous.

The low molecular weight iso mono-olefin polymers and copolymers such as the low molecular weight isobutylene-normal-butylene polymers can also be oxidized by treatment with ozone followed by hydrolysis. In carrying out the oxidation by this method the polymers are treated with oxygen and/or air which has preferably previously been subjected to silent electrical discharge to produce ozone. This oxidation should be conducted preferably at a low temperature, for example, from about 70° F. to about −40° F. The ozonides so formed are then subjected to hydrolysis, for example, by agitating the polymers so treated with boiling water. If desired, catalysts such as zinc dust and a trace of a silver salt may be added to the mixture. Also an oxidation inhibitor such as, for example, aromatic amines, aromatic hydroxy compounds or hydroquinone can be added. The addition of these agents prevents oxidation of the aldehydes formed in the hydrolysis to the acids and is therefore the preferred procedure when the formation of acids is not desired.

The oxidation of the low molecular weight polymers can also be accomplished by treating the same with peroxides or with "hydroxylation agents" to produce olefin oxides or glycols. By "hydroxylation agents" those compounds are intended which are capable of producing 1,2-glycols such as would be obtained by the adding of two hydroxyl groups at a double bond. "Hydroxylation" as used here results from the combined effects of oxidation and hydrolysis. These agents include peracids such as peracetic acid and perbenzoic acid, hydrogen peroxide and the like. The treatment with these agents is preferably carried out in solvents such as anhydrous tertiary alcohols in the presence of catalysts such as the oxides of osmium and other elements of groups IV, V and VI of the periodic table, such as titanium, zirconium, thallium, neodymium, chromium, molybdenum, tungsten and uranium and the like. Other oxidation agents such as potassium permaganate and potassium chromate and the like in aqueous solution can also be used. When aqueous solutions are used it is desirable to have an emulsifying agent present. For example, a butylene polymer consisting mostly of tetramer was oxidized with KMnO4 solution. About one hundred grams of the polymer were stirred with about 200 c.c. of water at about 200° F. About one-half gram of sodium stearate was added, and potassium permanganate added as reduced until 280 grams had been added. Considerable heat was evolved which was removed by adequate cooling. The oil was washed and about 85 grams of product were obtained. A comparison of the charge and the oxidized product was as follows:

|  | Charge | Oxidized product |
| --- | --- | --- |
| Bromine number | 61 | 5 |
| Mol. wt. | 262 | 325 |
| A. P. I. gravity degrees | 41 | 25 |
| Solution temperature (° F.) in 1 vol. acetone | +47 | Below −90 |

The bromine number indicates that substantially all of the charge was oxidized. Acidity determination showed that one in four of the polymer molecules had been converted to acid.

When the olefinic polymers, obtained by the heating of gaseous hydrocarbon mixtures in the presence of phosphoric acid catalysts in the synthesis of iso-octane, are utilized, it is desirable to obtain the crude trimer fraction which has a boiling point between 250° F. and 520° F., and mostly between 330° F. and 420° F. This crude trimer fraction can be oxidized by blowing air or oxygen therethrough, while the temperature is maintained preferably at about 250° F. The air blowing operation is carried on for about 4 days. The air is blown through the fraction at the rate of about 5 to 10 pounds per hour. The resulting oxidized trimer has a viscosity of 361 seconds at 100° F. and a viscosity index of −108.

The oxidized polymers prepared as indicated above or in any other suitable manner may be sulfurized, as indicated hereinafter, or if desired, the polymer may be sulfurized first and then oxidized. The sulfurization of the polymer or of the oxidized polymer may be accomplished by treating the same with elemental sulfur at a temperature of from about 300° F. to about 450° F., and preferably at a temperature of about 325° F. to about 375° F., until the sulfur has combined chemically with the polymer. The amount of sulfur which will combine with the polymer or oxidized polymer depends largely upon the amount of elemental sulfur used, the temperature employed, the time of reaction and, in the case of the polymer which has previously been oxidized, on the amount of combined oxygen, and the per cent of unsaturation. At a temperature of about 325° F. to about 375° F. from about 5% to about 20% sulfur can be combined with the low molecular weight butylene polymer in about 2 to 15 hours.

The sulfurization of the tetramer fraction may be accomplished by heating a mixture of the tetramer, in the presence or absence of a diluent, with sulfur at a temperature of about 300° F. to about 400° F., and preferably between 300° F. and 350° F., until the sulfurized product is non-corrosive to a copper strip, as determined by A. S. T. M. method. The sulfurized product may then be acid-treated and/or percolated through a decolorizing material such as fuller's earth to remove the objectionable dark bodies. If a diluent is used in the sulfurization it may be removed by steam stripping. The sulfurized product may also be refined by a distillation in which the 5%–20% bottoms are discarded.

The crude trimer obtained during the preparation of iso-octane, after having been oxidized in the manner described hereinbefore can be sulfurized by adding 20% by weight of elemental sulfur to the oxidized material and then heating for 5 hours at a temperature from 340° F. to about 350° F. The resulting product may be refined by any of the methods described above for the sulfurized tetramer.

It is also possible to sulfurize, in a manner similar to the foregoing, those isobutylene polymers which have molecular weights ranging from 100 to 800. It is to be particularly noted that this product, when added to lubricating oils, improves the oxidation characteristics thereof.

While it is possible to sulfurize and oxidize the polymers in separate steps, it is also possible and sometimes advantageous to effect the sulfurization and oxidation at one time. This is accomplished by adding elemental sulfur to the polymer and blowing air or oxygen or oxygen-containing gases through the polymer. The time and temperature conditions for this procedure are the same as those specified above for sulfurization.

As stated hereinbefore, the oxidation of the polymers results in the formation of acids. These acids will be formed whether the oxidation is carried out before or after the sulfurization or simultaneously therewith. The oxidation treatment in the presence of those metal oxides or metal hydroxides mentioned above results in the formation of some metallic soap. The presence of the metal in the oxidized and sulfurized isobutylene polymers imparts desirable detergent properties to the lubricating oils to which the oxidized and sulfurized isobutylene polymers are added.

Some of the foregoing compounds may not be completely soluble in the lubricant, in which case effective results are obtained by suspending the addition agent in the lubricant by means of a small amount of a peptizing agent such as aluminum napthenate, aluminum stearate, lecithin, etc.

It has been found that when the sulfurized, oxidized polymers, are added to lubricating oils in sufficient amounts so that 0.02% to 2.0% sulfur is present in the oil, the oxidation stability of the oils is improved. The presence of sulfur in the oil also improves the extreme pressure characteristics. If desired, however, other sulfur-type inhibitors may be added in order to further improve the above characteristics of the oil. It has been found that the oxidized, sulfurized polymers, when treated with the above-mentioned metals, will improve the detergent characteristics of the oil when added in amounts of from 0.05% to 2.0%. Modified polymers of this type will frequently contain sufficient sulfur so that additional sulfur inhibitors need not be added. However, other detergents and/or other sulfur-type inhibitors may be used in combination with these modified polymers.

The terms "oxidized polymer" and "sulfurized polymer" as used herein mean respectively the polymer having oxygen and sulfur chemically combined therewith. Likewise, the terms "oxidation" and "sulfurization" as used herein, and in the appended claims mean the combining of oxygen and sulfur with the polymer.

The term "co-polymer" as used herein and in the appended claims refers to the products obtained by the inter-polymerization of iso- and normal-olefins. The term "low molecular weight polymer" as used herein and in the appended claims means polymers of iso-olefins, such as isobutylene and co-polymers of iso-olefins and normal-olefins, such as isobutylene and butylene, respectively, said polymers having molecular weights lses than about 800.

The term "butylene polymer" as used herein and in the appended claims refers to co-polymers of iso- and normal-butylenes.

While in the foregoing we have explained our invention by reference to specific examples, it is to be understood that the invention is in no way limited to these examples, the scope of the invention being defined by the appended claims.

We claim:

1. A composition of matter comprising olefin polymers containing a chemically combined metal and chemically combined sulfur and oxygen obtained by treating said polymers with elemental sulfur and an oxygen-containing material in the presence of a metal compound selected from the group consisting of metal oxides and metal hydroxides.

2. A composition of matter comprising iso-olefin polymers containing a chemically combined metal and chemically combined sulfur and oxygen obtained by treating said polymers with elemental sulfur and an oxygen-containing material in the presence of a metal compound selected from the group consisting of metal oxides and metal hydroxides.

3. A composition of matter comprising mono-olefin polymers containing chemically combined sulfur and oxygen.

4. A composition of matter comprising mono-olefin polymers containing a chemically combined metal and chemically combined sulfur and oxygen.

5. A composition of matter comprising mono-iso-olefin polymers containing chemically combined sulfur and oxygen.

6. A composition of matter comprising mono-iso-olefin polymers containing a chemically combined metal and chemically combined sulfur and oxygen.

7. A composition of matter comprising a sulfurized and oxidized derivative of isobutylene polymers.

8. A composition of matter as claimed in claim 5 wherein the polymers comprise the polymers of isobutylene.

9. A composition of matter as claimed in claim 3 wherein the polymers comprise the co-polymers of isobutylene and normal butylene.

10. A composition of matter comprising olefin polymers having a molecular weight of less than 800 and containing chemically combined sulfur and oxygen.

11. A composition of matter comprising low molecular weight mono-olefin polymers containing a chemically combined metal and chemically combined sulfur and oxygen.

12. A composition of matter as claimed in claim 11 wherein the metal is selected from the group consisting of the metals of Group I and Group II.

13. A lubricant comprising a lubricating oil and oxidized and sulfurized mono-olefin polymers.

14. A lubricant comprising a lubricating oil and oxidized and sulfurized mono-olefin polymers having a metal combined therewith.

CLARENCE M. LOANE.
JAMES W. GAYNOR.